Jan. 12, 1943.    M. J. PHILLIPS    2,307,949
FLOW RESTRICTOR
Filed Aug. 5, 1941

Inventor:
Michael J. Phillips
By: Edward C. Fitzhaugh
Atty.

Patented Jan. 12, 1943

2,307,949

UNITED STATES PATENT OFFICE 2,307,949

FLOW RESTRICTOR

Michael J. Phillips, Cleveland, Ohio, assignor to Pump Engineering Service Corporation, Cleveland, Ohio, a corporation of Ohio Application August 5, 1941, Serial No. 405,497

5 Claims. (Cl. 137—153)

This invention relates to valve assemblies for limiting the maximum rate of flow therethrough and particularly to a valve assembly of this type which is so arranged as to not be appreciably influenced either by the inlet pressure or the back pressure acting thereon.

It is a general object to provide an improved valve assembly for limiting the maximum rate of flow therethrough including means rendering the same unaffected by inlet pressure and means rendering the same unaffected by back pressure acting thereon.

It is a more detailed object to provide a valve assembly of this type including means responsive to the rate of flow therethrough effective to vary the position of the valve proper with reference to its seat for limiting the rate of flow therethrough to a predetermined maximum value, which valve assembly includes means for balancing the same against inlet pressure effects as well as means for balancing the same against back pressure effects.

A still more detailed object is to provide a valve construction having the above characteristics including an arrangement of elements which is efficient in operation, economical of manufacture and capable of ready assembly and disassembly for the purpose of inspection and repair.

Another object of this invention is the provision of a valve assembly of the above type having peculiar and novel application to operation and synchronization of remotely located fluid responsive instrumentalities such, for example, as wing elements of an aircraft.

Other and more particular objects, advantages and uses of my invention will become apparent from a reading of the following specification taken in connection with the accompanying drawing forming a part thereof and wherein.

Figure 1:
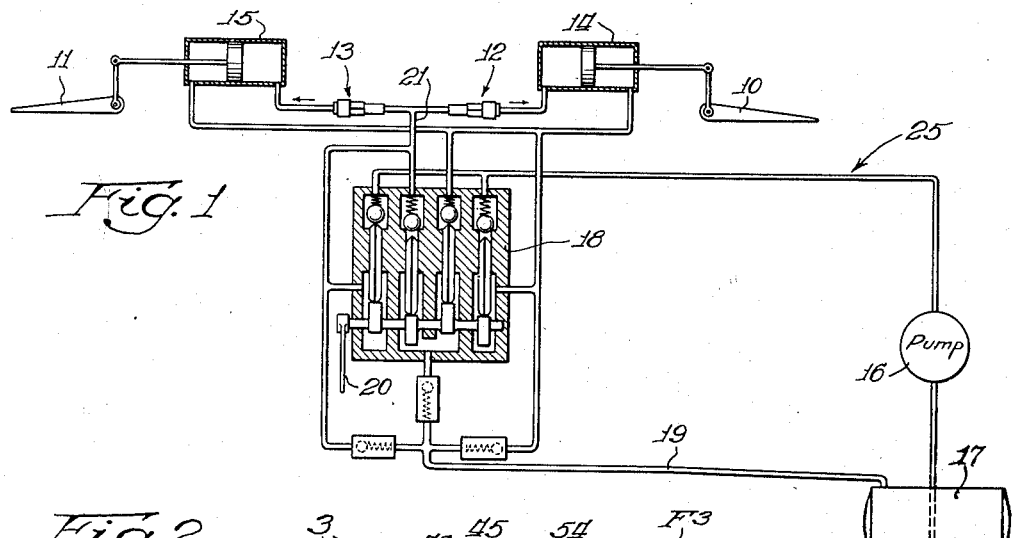
Fig. 1 is a schematic view showing one general arrangement including the invention as applied to the operation of wing elements of an aircraft.

Referring in greater detail to the figures of the drawing, 10 and 11 indicate generally wing flaps or other wing elements of an aircraft, which elements are normally located remotely from each other and have certain particular requirements as to just how the same shall be operated, which requirements are satisfied by the valve construction and arrangement herein presented. It has been found that elements 10 and 11 are subject to different air load conditions under different circumstances and hence require corresponding differences in power for operating the same. For example, in the event that the air load on element 10 is very small or actually assists the movement of the element 10 in the desired direction, the application of full power thereto would have the result of imposing fatal shock upon the assembly due to the rapid operation and sudden stopping thereof when the same reaches its limit of movement. For this and other reasons it is therefore imperative that some means be provided for delivering the required fluid pressure for operating these elements while at the same time preventing the delivery thereof at a rate in excess of a predetermined value.

For accomplishing this function, identical flow restrictor valve assemblies indicated generally at 12 and 13 are employed for controlling the flow respectively to hydraulic motors 14 and 15, which function to operate elements 10 and 11. As will be seen from the following detailed description, valve assemblies 12 and 13 each operate to prevent the rate of flow to the respective hydraulic motors from rising above a predetermined value regardless of the differences in the respective values of the back pressures as well as the value of the inlet pressure. From the detailed description of these valves it will be seen that variations in the back pressure due to the differences in the resistance to operation of elements 10 and 11 have no effect upon the rate of maximum delivery through the valves, since the same are balanced against back pressure. Similarly it will be seen that variations in the pressure delivered to the inlet of valves 12 and 13 will have no effect upon the maximum rate of flow, since the valves are balanced against inlet pressure effects. As an example of one of the important advantages growing out of this mode of operation, consider a situation wherein elements 10 and 11 are to be operated where element 10 offers practically no resistance and element 11 offers a relatively high resistance. Valve assembly 12 under these circumstances will function to permit only a predetermined maximum rate of flow to hydraulic motor 14 notwithstanding the fact that element 10 is offering no appreciable resistance. This has the important result of making it possible to deliver the necessary pressure through valve 13 to hydraulic motor 15 in order to operate element 11 against the relatively high resistance offered thereby. But for this limitation of maximum flow through valve assembly 12, there would not be sufficient pressure delivered through valve assembly 13 to operate element 11 against the relatively high resistance.

For the purpose of delivering fluid such, for example, as oil to the hydraulic motors 14 and 15 through valves 12 and 13, I have illustrated a conventional arrangement of supply lines indicated generally at 15 including a pump 16, tank 17 distributing valve assembly 18 and return lines 19, the valve assembly 18 being under the control of manually operated lever 20. The important feature to be noted with reference to fluid supply, is that fluid under pressure is delivered through a common line 21 to a common junction leading to the inlet of each of the valves 12 and 13.

Figure 2:
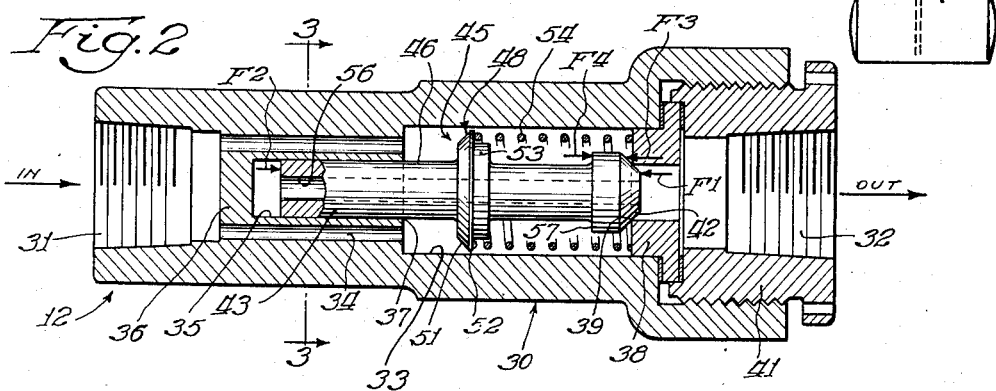
Fig. 2 is an enlarged axial section of one of the valve assemblies indicated schematically in Fig. 1.
Figure 3:
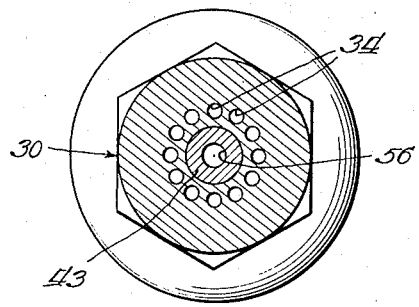
Fig. 3 is a cross-section taken substantially on the line 3—3 of Fig. 2.

Turning now to a consideration of the specific features of the preferred embodiment of my invention disclosed particularly in Fig. 2, an elongated housing is indicated generally at 30, comprising a threaded inlet opening 31 adapted for connection to a single source of pressure, and a threaded outlet 32 adapted for connection to the fluid instrumentality to be operated. A valve chamber is formed within housing 30 intermediate the end thereof in communication with inlet 31 through a plurality of coaxially extending passages 34 disposed within said housing radially outwardly of a centrally disposed cylinder 35 having a closed end 36 and an open end 37 facing and communicating with valve chamber 33. Restricting the opposite end portion of valve chamber 33 is a readily removable valve seat defining member 38 formed with a valve seat 39 disposed in general coaxial relation to cylinder 35 and held in position for ready removal and replacement by an externally threaded tubular plug 41 threadably received in the end of housing 30.

For controlling the rate of flow through the valve housing from inlet 31 to outlet 32, I provide a particular construction of valve assembly proper 45 comprising an elongated stem 46 terminating at one end in a general frusto conical valve proper 42 adapted to be received in engagement with valve seat 39 and terminating at the other end thereof in a piston-like portion 43 received in sealed relation within the open end 37 of cylinder 35. Extending radially from the intermediate portion of stem 46 is a flange-like member 48 in predetermined spaced relation to the surrounding inner peripheral wall 33 of the valve chamber, thus providing a space for the flow of fluid between this flange member and the wall of the valve chamber. The flow of fluid through this confined space imposes a coaxial pressure on flange member 48 urging valve 42 into engagement with its seat with a force proportional to the rate of flow past flange 48. It is a desired object that the valve be rendered responsive solely to this one force, namely the force resulting from the flow of fluid past flange 48. While my invention broadly contemplates the use of any means corresponding to flange 48, the essential characteristic of such means being that it provide a predetermined resistance to flow, thereby thus creating an axial pressure in the direction of the valve seat, I have nevertheless found that the construction shown affords very satisfactory and novel advantages. This construction includes a generally frusto conical portion 51 merging sharply with a relatively thin cylindrical portion 52 closely spaced to the surrounding peripheral wall. As a specific example only of such spacing, I have found to be satisfactory, a spacing of about .010" to about .055". On the side of flange 48 facing valve seat 39 there is provided a recessed shoulder 53 embracingly receiving one end of a compression coil spring 54, the other end of which is received about valve seat 39.

It is important to note that valve 45 is balanced against the effects of back pressure which would otherwise tend to influence the operation thereof. This balancing is accomplished by providing a bore or passage 56 extending from the frusto conical end of valve 39 to the piston portion 43 of stem 46 and making the effective area of the frusto conical valve 42 subject to back pressure tending to open the valve equal to the effective area of the end of the piston 43 subject to the same back pressure tending to close the valve, with the result that the force indicated at F1 is balanced by the force indicated at F2. Similarly, frusto conical valve 42 is provided with an opposed surface 57 having an effective area subject to inlet pressure tending to close the valve which is equal to the effective area of that portion of the frusto conical surface 42 subject to inlet pressure tending to open the valve with the result that the force indicated at F3 is balanced by the force indicated at F4.

The actual design of dimensions to provide these balanced effective areas may be readily computed by standard engineering practice for any desired size of such valve for giving a particular rate of flow or the same may be accomplished by a cut and try method. It is a relatively simple matter to determine the direction of unbalance merely by delivering the full rate of flow through the valve and varying the differential pressure between the inlet and outlet. If for any particular valve assembly for example force F2 is found to be greater than F1, then the rate of delivery will go down with increase in the input pressure. While if F1 and F2 are equal, an increase in the differential pressure will not cause a reduction or increase in the rate of flow. Similarly, if force F3 is less than force F4, then as the inlet pressure is increased, the valve will be forced in the direction of its seat with an increasing pressure, thus decreasing the rate of flow. The above unbalanced conditions are easily remedied by varying the respective areas in accordance with the result in operation obtained. Compression spring 54 will of course be chosen with reference to the rate of flow desired, since it is against this spring that the force controlling the operation of valve 42 acts, this force resulting from the passage of fluid between the flange 48 and the valve chamber housing.

It will thus appear from the above description that I have provided an improved maximum rate of flow valve subject in its operation only to the rate of flow of fluid therethrough, the same being balanced both against the effects of inlet pressure and the effects of back pressure.

While I have disclosed my invention in connection with certain specific embodiments, this is intended by way of example and not by way of limitation, it being intended that my invention be defined by the appended claims which should be given a scope as broad as permitted by the prior art.

I claim:

1. In a maximum flow restricting valve assembly, including means defining an elongated housing having an inlet, an outlet, an elongated valve chamber between said inlet and said outlet, a valve seat facing said chamber and communicating with said outlet, a valve assembly including a conical-like valve adapted to be received in engagement with said seat, resilient means urging said valve away from said seat with a predetermined force, the combination therewith of means for balancing said valve assembly against the effect of back pressure, means for balancing said valve assembly against the effect of inlet pressure, and means responsive to variations in the rate of flow to correspondingly vary the movement of said valve assembly against said resilient means moving said valve with reference to said seat to restrict the flow upon the occurrence of increasing flow past said means, thus preventing any increase in rate of flow beyond a predetermined maximum.

2. In a maximum rate of flow restricting valve assembly, including means defining an elongated housing having an inlet, an outlet, an elongated valve chamber between said inlet and said outlet, a valve seat facing said chamber and communicating with said outlet, a flow restricting valve assembly including a stem terminating at one end in a conical-like valve adapted to be received in engagement with said seat, the other end terminating in a piston-like portion, a radial flange-like means extending from the intermediate portion of said stem within said chamber and in predetermined space relation to the wall of said chamber, means in said housing defining a cylinder one end of which is closed and the other end of which is open in the direction of said chamber for receiving said piston portion of said stem, a passage formed in said stem between the conical end of said valve and the end of said piston within said cylinder, the area of said conical valve responsive to back pressure tending to open the same being so proportioned relative to the area of the end of said piston within said cylinder tending to urge said valve in the direction of said seat in response to back pressure that the two forces substantially balance each other, said conical valve being also provided with an opposite face so proportioned in area to said conical valve as to substantially balance said valve against the effects of inlet pressure, coiled compression spring means within said chamber embracing said stem for urging said valve away from said seat with a predetermined force, whereby said valve assembly is controlled by the rate of flow between said radial flange and the wall of said chamber and is substantially uninfluenced by either the inlet pressure or the back pressure.

3. In a maximum rate of flow restricting valve assembly, including means defining an elongated housing having an inlet, an outlet, an elongated valve chamber between said inlet and said outlet, a restricted valve seat of lesser cross-sectional area than the area of said chamber facing said chamber and communicating with said outlet, a valve assembly including a stem terminating at one end in a conical-like valve adapted to be received in engagement with said seat, the other end of said stem terminating in a piston-like portion, means in said housing defining a cylinder in general coaxial alignment with said valve seat having one end closed and the other end open facing in the direction of said chamber for receiving said piston portion of said stem therein, fluid passage defining means located radially outwardly of said cylinder for communicating said inlet with said chamber, radial flange-like means extending from the intermediate portion of said stem within said chamber in predetermined spaced relation to the surrounding inner peripheral wall thereof providing for the passage of fluid between said flange and said wall, said flow acting upon said flange to urge said valve in the direction of said seat with a force proportional to the rate of flow past said flange, compression coil spring means positioned within said chamber and functioning to urge said valve away from said seat with a predetermined force, a passageway formed in said stem connecting said forward conical-like end portion with the end of said piston within said cylinder for communicating back pressure to said cylinder, the area of said conical-like valve responsive to back pressure tending to open said valve being so proportioned with reference to the area of the end of said piston within said cylinder responsive also to back pressure tending to close said valve that these two forces substantially balance each other thus rendering said valve substantially unresponsive to back pressure, said conical valve being further provided with an opposite surface portion having an effective area responsive to inlet pressure tending to close the valve so proportioned to the effective area of the under side of said conical valve subject to inlet pressure tending to open the same that said forces substantially balance each other thus rendering said valve substantially unresponsive to inlet pressure, whereby said valve is substantially solely responsive to the rate of flow therethrough.

4. In a valve assembly effective to limit the maximum rate of flow therethrough, including a generally elongated housing provided at a first end thereof with means adapted to connect the same with a source of fluid pressure and provided at the other end thereof with means adapted to connect the same with a fluid pressure receiver, said housing being formed with an elongated main valve assembly receiving chamber intermediate said end portions thereof, means defining a cylinder within said housing one end of which is closed the open end of which communicates with and faces said valve chamber, means placing said first end of said housing in communication with said valve chamber adjacent the open end of said cylinder, means defining a valve seat of lesser cross-sectional area than that of said valve chamber, located in opposed spaced coaxial relation to the open end of said cylinder, facing said valve chamber and communicating with said outlet, means defining a valve assembly received within said housing, said means comprising an elongated stem terminating at one end in a conical-like valve arranged to be received in engagement with said seat and terminating at the other end in a piston-like portion received within said cylinder, said stem being provided intermediate the ends thereof with a radially extending flange-like portion located within said valve chamber and terminating in a predetermined spaced relation to the inner peripheral wall thereof to provide a passage therebetween for the flow of fluid, said stem being further particularly characterized by the provision of a passage connecting the discharge end of said conical valve with said cylinder for the purpose of communicating back pressure to said cylinder, the area of said conical valve subject to back pressure tending to open said valve being so proportioned to the area of the end of said piston-like portion within said cylinder tending to close said valve in response to back pressure that said forces balance each other, said arrangement being further characterized by said conical valve being provided with an opposite shoulder portion facing axially away from said seat subject to inlet pressure, said shoulder portion having an effective area so proportioned with reference to the face of said conical portion tending to open said valve as to balance said valve against the effects of inlet pressure, a compression coil spring embracingly received about said valve stem within said valve chamber and functioning to urge said conical valve away from said seat with a predetermined force, said radially extending flange responding to changes in the rate of flow of fluid thereby to vary the position of said valve with respect to said seat to thus limit the rate of flow to a predetermined maximum.

5. In a valve assembly for restricting the maximum rate of flow therethrough, including means defining an elongated housing having a fluid inlet, a fluid outlet, an elongated valve chamber between said inlet and said outlet, means defining a restricted valve seat facing said chamber and communicating with said outlet, a valve assembly including a stem terminating at one end in a conical-like valve adapted to be received in engagement with said seat, the other end of said stem terminating in a piston-like portion, flange-like means extending radially from the intermediate portion of said stem in predetermined closely spaced relation to the surrounding inner peripheral wall of said valve chamber, means in said housing defining a cylinder one end of which is closed the other end of which is in open communication with said valve chamber, said cylinder being positioned in generally coaxial relation to said valve seat and receiving said piston-like portion of said stem in the open end thereof, a plurality of coaxially extending passages in said housing spaced outwardly of said cylinder and placing said inlet in communication with said valve chamber at points adjacent the open end of said cylinder, said valve seat defining means comprising a readily removable member fitting in the end of said valve chamber and having said valve seat formed therein, said member being maintained in position by a tubular-like plug externally threaded to said housing and internally threaded for connection to an outlet delivery line, and a valve assembly proper received in said housing comprising a stem terminating at one end in a general frusto conical valve adapted to be received in engagement with said seat and terminating at the other end thereof in a piston portion received in said cylinder, said stem being formed with a passage for communicating back pressure to said cylinder for balancing said valve against the effects of back pressure.

MICHAEL J. PHILLIPS.